United States Patent
Guo et al.

(10) Patent No.: US 8,732,216 B2
(45) Date of Patent: May 20, 2014

(54) DOCBASE MANAGEMENT SYSTEM AND METHOD FOR EXTENDING DOCBASE MANAGEMENT SYSTEM AND FUNCTIONS

(75) Inventors: Xu Guo, Beijing (CN); Donglin Wang, Beijing (CN); Changwei Liu, Beijing (CN); Ningsheng Liu, Beijing (CN)

(73) Assignee: Sursen Corp., Beijing (CN)

( * ) Notice: Subject to any disclaimer, the term of this patent is extended or adjusted under 35 U.S.C. 154(b) by 900 days.

(21) Appl. No.: 12/415,436

(22) Filed: Mar. 31, 2009

(65) Prior Publication Data

US 2009/0187604 A1 Jul. 23, 2009

Related U.S. Application Data

(63) Continuation of application No. PCT/CN2007/070257, filed on Sep. 9, 2007.

(30) Foreign Application Priority Data

Oct. 17, 2006 (CN) .......................... 2006 1 0113805

(51) Int. Cl.
*G06F 17/30* (2006.01)
*G06F 12/00* (2006.01)

(52) U.S. Cl.
USPC ........................... 707/821; 717/168; 707/822

(58) Field of Classification Search
None
See application file for complete search history.

(56) References Cited

U.S. PATENT DOCUMENTS

| | | | | |
|---|---|---|---|---|
| 7,493,614 | B2 * | 2/2009 | Liu et al. ........................ | 717/175 |
| 7,818,666 | B2 * | 10/2010 | Dorsett et al. ................. | 715/237 |
| 2002/0055958 | A1 * | 5/2002 | Edwards et al. ............... | 707/514 |
| 2004/0267755 | A1 | 12/2004 | Don et al. ........................ | 707/10 |
| 2006/0026591 | A1 * | 2/2006 | Backhouse et al. ........... | 717/177 |
| 2006/0200818 | A1 * | 9/2006 | Oprea et al. ................... | 717/174 |
| 2006/0224759 | A1 * | 10/2006 | Fang et al. ..................... | 709/231 |
| 2009/0222534 | A1 * | 9/2009 | Kitada ........................... | 709/217 |

FOREIGN PATENT DOCUMENTS

WO WO 2006/096209 A1 9/2006

OTHER PUBLICATIONS

Yan, Hou, et al., "Using SOAP technology in document management system", Computer and Moderization, Guangdong University of Technology, (2006).
Zhang, et al., "Design and implementation of document management system for internet", Computer engineering and design, (2004).
The J2EETM Tutorial, Chinese version.
Second Office Action issued for Chinese Patent Application No. 2006101138052.
EP Search Report for European Patent Application No. 07764185.0; Dec. 1, 2011.

* cited by examiner

*Primary Examiner* — Alicia Lewis
(74) *Attorney, Agent, or Firm* — Duane Morris LLP

(57) ABSTRACT

The present invention discloses a docbase management system and a method for extending docbase management system functions. The method includes: determining an extended function module which matches extended data, wherein, the extended function module is compatible with a system extension interface in a docbase management system; invoking, through the system extension interface of the docbase management system, the determined extended function module to process the extended data. The method provided by the present invention enables the docbase management system functions to be extended without recompiling the docbase management system.

16 Claims, 2 Drawing Sheets

DOCBASE MANAGEMENT SYSTEM AND METHOD FOR EXTENDING DOCBASE MANAGEMENT SYSTEM AND FUNCTIONS

CROSS-REFERENCE TO RELATED APPLICATIONS

This application claims the benefit and is a continuation of PCT/CN2007/070257 filed Sep. 9, 2007, which is the PCT filing of CN 200610113805.2, filed Oct. 17, 2006, both of which applications are fully incorporated herein by reference.

FIELD OF THE INVENTION

The present invention relates to electronic document processing, and particularly to a docbase management system and a method for extending docbase management system functions.

BACKGROUND OF THE INVENTION

A docbase management system is a complicated software system adapted to organize, manage, secure, store and display massive electronic documents. A prior patent application with the application number of CN200510131072.0, filed by the same applicant of the present invention, provides a document processing system which includes a docbase management system, a storage device and an application. In the document processing system, data of the docbase management system are stored in the storage device and the docbase management system is connected with the application through a standard invocation interface. The standard invocation interface is defined by using predefined actions and objects. Operations performed by the application on a document are unified to operations applied to a predefined universal document model and the application sends instructions through the standard invocation interface to the docbase management system, and then the docbase management system performs operations corresponding to the instructions on the docbase stored in the storage device.

Having had powerful functions, the docbase management system still needs more sufficient or suitable functions to cope with various application environments. A flexible method for extending docbase management system functions may influence the serviceability of the docbase management system a lot in diversified application environment.

Normally, system function extension after the docbase management system is compiled and published requires modification to source code of the docbase management system, recompilation and republication. Therefore the function extension of the docbase management system is very limited.

SUMMARY OF THE INVENTION

A technical problem to be solved by the present invention is to provide a method for extending docbase management system functions without recompiling the docbase management system.

A method for extending docbase management system functions includes:
 determining an extended function module which matches extended data, wherein, the extended function module is compatible with a system extension interface in a docbase management system;
 invoking, through the system extension interface of the docbase management system, the determined extended function module to process the extended data.

A docbase management system includes:
 a first module, adapted to determine an extended function module which matches extended data and notify a second module of the determined extended function module, wherein, the extended function is compatible with a system extension interface in a docbase management system, and
 the second module, adapted to receive the notification from the first module and invoke, through the system extension interface in the docbase management system, an interface of the determined extended function module to process the extended data.

The embodiments of the present invention also provide one or more computer memories collectively storing an extended function module compatible with a system extension interface in a docbase management system,
 wherein, when being invoked through the system extension interface of the docbase management system, the extended function module is ability to process extended data which matches the extended function module.

It can be seen from the description above that the docbase management system provided by the present invention has the ability to parse the extended data and invoke the extended function modules, thus the docbase management system is able to extend its own functions by invoking functions of the extended function modules without modifying the system itself, and the extendibility and flexibility of the docbase management system are therefore improved.

Due to nature features of the docbase management system, applications conforming with the docbase standard perform an operation on the document through the docbase management system, therefore, when using the method for extending docbase management system functions provided by the present invention, functions of the applications (such as supporting a new image format) are automatically extended without doing any modification on the applications. Furthermore, the system extension interface can be independent with any specific docbase management system, so a standard about the system extension interface can be developed, at the situation, a extended function module can be applied to extend not only functions of a specific docbase management system, but also functions of other various docbase management systems, so great merits are brought out.

In addition, since the extended function module is docbase management system independent and can be located on a remote server, functions of an application can be extended just by installing an extended function module at the server side without doing any modification on a desktop side. In another word, without developing a new version of the application, without developing a new version of the docbase management system, and ever without any installation setting on user's computer, the functions of the application can be extended automatically after installing a extended function module developed by third party on server side.

DETAILED DESCRIPTION OF THE INVENTION

The present invention is further described in detail hereinafter with reference to the accompanying drawings and embodiments to make the objectives, solution and merits of the present invention more apparent.

Figure 1:
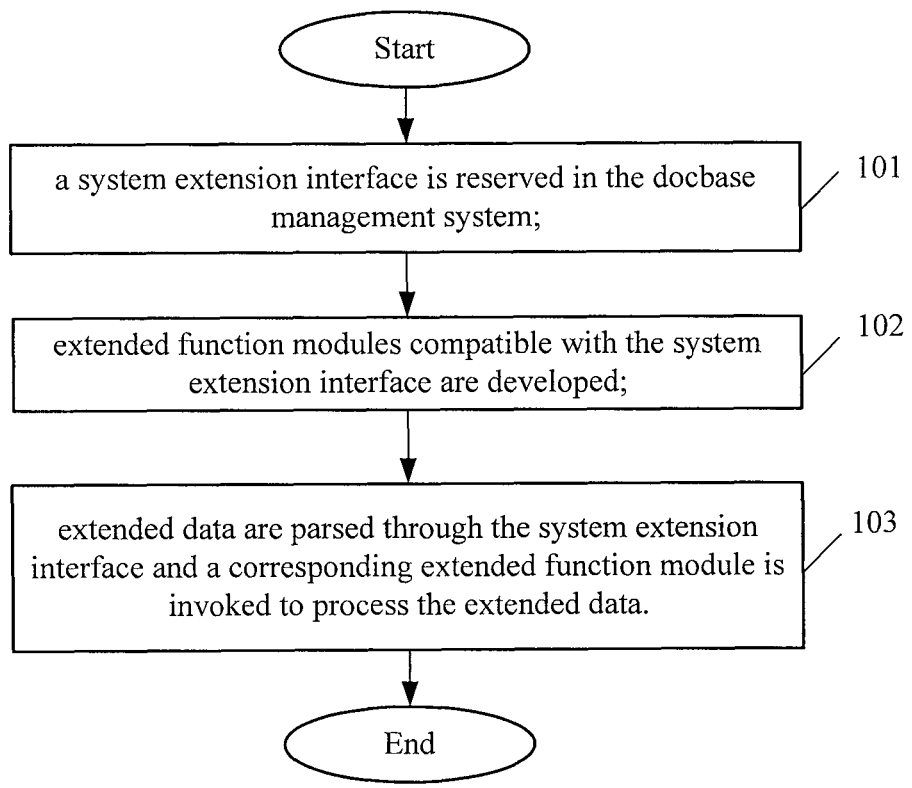
FIG. 1 is a general flowchart of the method for extending docbase management system functions in accordance with an embodiment of the present invention.

FIG. 1 is a general flowchart of the method for extending docbase management system functions in accordance with an embodiment of the present invention. As shown in FIG. 1, the method includes following steps.

Step 101: a system extension interface is reserved in a docbase management system.

Step 102: extended function modules compatible with the system extension interface are developed by developers according to practical needs.

Step 103: when the docbase management system is running, through the system extension interface, extended data are parsed and a corresponding extended function module is invoked to process the extended data by executing a function not provided by the docbase management system itself.

When the docbase management system is designed, the functions of desired extended function modules cannot be predicted, so a preset interface for extended function modules, i.e., the system extension interface is set up in the docbase management system. When the docbase management system is running, the extended data can be parsed and the corresponding extended function module can be invoked through the preset system extension interface to process the extended data.

Figure 2:
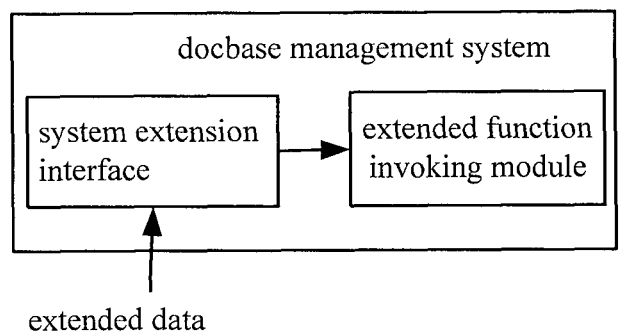
FIG. 2 is a general structure diagram of the docbase management system in accordance with an embodiment of the present invention.

FIG. 2 is a general structure diagram of the docbase management system in accordance with an embodiment of the present invention. As shown in FIG. 2, the docbase management system includes a system extension interface and an extended function invoking module.

The system extension interface is adapted to parse extended data, determine a corresponding extended function module, and notify the extended function invoking module of the determined extended function module.

The extended function invoking module is adapted to receive the notification from the system extension interface and invoke an interface of the determined extended function module to process the extended data from the system extension interface.

The system extension interface of the docbase management system provided by the present invention may include an extended data parsing interface. The extended data compatible with the extended data parsing interface conform to a preset format and include an extension identifier. The docbase management system can obtain the extension identifier from the extended data by invoking the extended data parsing interface.

The system extension interface of the docbase management system provided by the present invention may further include an extended module invoking interface. The extended module invoking interface is adapted to acquire the extended function module matching the extension identifier of the extended data. An extended function module compatible with the extended module invoking interface includes interfaces of different functions. The docbase management system can execute the functions provided by the interfaces of the extended function module respectively through the extended module invoking interface.

The above is general description of the docbase management system and the method for extending the docbase management system functions provided by the present invention, and detailed description of the present invention will be explained hereinafter with reference to embodiments of the present invention.

Embodiment

Figure 3:
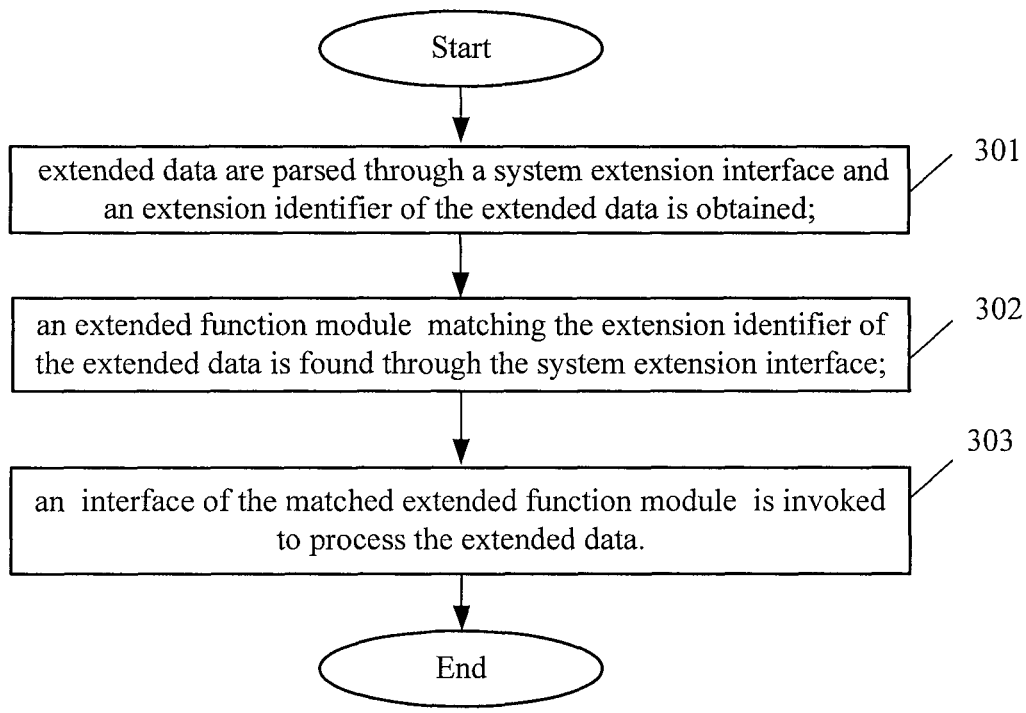
FIG. 3 is a flowchart of processing extended data by the docbase management system in accordance with an embodiment of the present invention.

In the prior art, functions of the docbase management system cannot be extended without recompiling the docbase management system. The embodiment of the method for extending docbase management system functions provided by the present invention is explained by illustrating the flow of processing the extended data. As shown in FIG. 3, in the embodiment, the flow of processing the extended data in the docbase management system includes following steps.

Step 301: the docbase management system parses the extended data through a system extension interface and obtains the extension identifier (ID) of the extended data.

The docbase management system acquires the extended data, e.g., glyph data, from a storage device or during the docbase working process. The glyph data are vector or bitmap data adapted to describe font outline information. While a piece of text is displayed, glyph data of characters in the text shall be obtained firstly from the font, and then the text is displayed according to the vector or bitmap information described in the glyph data. The extended data are parsed and the extension identifier is obtained by invoking an extended data parsing interface. The extended identifier can be obtained in different ways according to different situations.

One situation is that the extended data are stored as an extended object. The extended object is a type of objects defined in the docbase and specifically for storing the extended data. The extended data includes the extension identifier and extended instance data. In such situation, the docbase management system parses the extended object according to a preset format to obtain the extension identifier.

Another situation is that the extended data are stored as an object supported by the docbase management system. For example, the docbase management system supports image objects. Normally, image formats supported by the docbase management system have been registered in the docbase management system. The docbase management system recognizes format information in an image object according to the registered format information and then processes the image data accordingly. When the extended data are stored in the docbase as an image object of a new format, when determining, after analyzing, that the format of image object is not included in the image formats supported by the docbase management system, the docbase management system shall regard data in the image object as the extended data by default and take the format information as the extension identifier. The docbase management system processes extended data which is stored as supported objects in a way similar to the way of an image object.

Yet another situation is that the extended data are acquired during the working process of the docbase management system. In such situation, the extension identifier is determined according to the type of the extended data, e.g., glyph data.

Step 302: the docbase management system searches for an extended function module matching the extension identifier of the extended data through the system extension interface.

In a preferred embodiment of the present invention, an extended function module in accordance with the present invention may include an identifier interface and an enumeration interface. All interfaces of the extended function module can be acquired through the enumeration interface of the extended function module, and the extension identifier of the extended function module can be acquired through the identifier interface. The docbase management system firstly invokes the enumeration interface of the extended function module, then acquires the identifier interface of the extended function module, and finally obtains the extension identifier through the identifier interface of the extended function module. After that, the docbase management system compares the extension identifier with the extension identifier of the extended data, if the two identifiers match each other, the extended function module shall be the extended function module in charge of the processing of the extended data.

In the above process, all the extended function modules would be traversed to find the extended function module matching the extension identifier of the extended data. In order to be more efficient, all the extended function modules may be registered as different types in the docbase management system. The information for registering includes corresponding relation information between a type name and extended function modules which belongs to the type. As described above, provided that "image object" is a type which has been registered in the docbase management system, when the docbase management system processes a image format is not included in the image formats supported by the docbase management system, the docbase management system firstly searches the registered information for the extended function modules included in "image object" type and then queries the extended function modules included in "image object" type for the extended function module matching the extension identifier of the extended data. If the matched extended function module has been registered in the docbase management system, the extended function module can be found. By registering the extended function modules according to the above method, the range among which extended function modules need be queried can be narrowed down and the efficiency of the system can be improved.

In another embodiment, instead of providing the identifier interface by the extended function module, mapping information between extended function modules and extension identifiers are registered in the docbase management system. The mapping information may be registered to the docbase management system by an application or an extended function module. After obtaining the extension identifier of the extended data, the docbase management system searches for the extended function module matching the extension identifier of the extended data according to the registered mapping information between the extended function modules and the extension identifiers. The registered mapping information may be stored in a specific file or in a registry entry and the docbase management system acquires the mapping information from the file or the registry entry. The docbase management system may manage the mapping information by providing a dedicated extended function module registration interface or by modifying the file or the registry entry directly.

Step 303: an interface of the corresponding extended function module is invoked to process the extended data.

The extended function module sometimes needs to construct an extended instance to process the extended data. In such situation, the extended function module usually includes a construction interface and a destruction interface. When the matched extended function module is determined, the construction interface of the extended function module is acquired through the enumeration interface of the extended function module and an extended instance is thus constructed. Sometimes the construction interface needs the extension identifier and/or the extended instance data as parameters to construct the extended instance. Then the needed function interface is acquired through the enumeration interface to process the extended data. When the extended data have been processed, the destruction interface of the extended function module is invoked to destroy the extended instance. When the extended function module can process the extended data without the extended instance, the needed function interface is acquired directly through the enumeration interface to process the extended data. In the simplest situation, for example, when the extended function module includes only one function interface, the function interface can be invoked directly without the enumeration interface.

The extended function modules are independent of the docbase management system and always loaded into the docbase management system when needed or when the docbase management system is initializing. Before being loaded, the extended function modules are stored as static files, such as Dynamic Link Library files in Windows system, or so files in Linux system, or jar or class files in Java Virtual Machine environment, or Dynamic Library files in Unix system. One file may contain one or multiple extended function modules; and when the file contains multiple extended function modules, the file shall also contain information used for distinguishing the multiple extended function modules. The docbase management system may set up one or multiple fixed default directories to store the files containing the extended function modules and the docbase management system manages the extended function modules by managing the contents of the directories. When a file containing an extended function module is placed in a default directory, the file can be found by the docbase management system and be loaded into the system. Or, the directory of the file containing extended function modules may be not limited as fixed and the docbase management system may manage the extended function modules through a configuration file, registry or database. When a new extended function module is added, a corresponding entry is added into the configuration file, registry or database to record the directory information of the file containing the extended function module, and the docbase management system finds and loads the extended function module according to the entry. When an extended function module is deleted, the docbase management system just needs to delete the corresponding entry. The process of loading an extended function module may include following steps:

the name of the file containing the extended function module and the directory of the file are acquired; and the extended function module is loaded into memory by using the dynamic loading technology.

The directory of the file containing the extended function module may be in a remote server and the extended function module is managed through an interface provided by the server. The remote server may be a Network File System (NFS) server, a Lightweight Directory Access Protocol (LDAP) server, a Distributed File System (DFS) server or other directory servers (such as a server supporting X.500 standard).

As described above, the extended function module in accordance with the present invention may include the enumeration interface through which all the interfaces of the extended function module can be acquired. To be particular, when a file contains multiple extended function modules, the file may include one enumeration interface shared by all the extended function modules contained in the file and all interfaces of the extended function modules in the file can be acquired through the enumeration interface; or each extended function module contained in the file contains its own enumeration interface, through which all interfaces of the extended function module can be acquired.

The extended function module in accordance with the present invention may further include a message interface. The docbase management system or the application can acquire configuration information of message processing of the extended instance through the message interface of the extended function module, therefore the docbase management system or the application sends messages to the extended instance according to the configuration information and then the extended instance responds to the received messages. Furthermore, the extended function module may include a reversed message interface. The docbase management system or the application informs, through the reversed message interface of the extended function module, the extended instance of the configuration information adopted for message processing. When the docbase management system or the application has invoked the reversed message interface of the extended function module, the extended instance can send messages to the docbase management system or the application according to the configuration information received from the reversed message interface. When an extended function module includes both the message interface and the reversed message interface, a bidirectional message channel can be set up between the extended instance and the docbase management system or the application by invoking the corresponding interfaces.

The messages should be defined in advance so that the receiver of the messages from the message interface or reversed message interface can process the messages properly. The standard messages defined in advance include a message for creating an extended instance window, a message for acquiring a display bitmap of the extended data, a message for adding/deleting a menu, a toolbar, a menu item or a toolbar button, a message for changing the display area of the extended instance and a message for refreshing the display area of the extended instance.

It should be noted that the interfaces of the extended function module, e.g., the identifier interface, the enumeration interface, the construction interface, the destruction interface, the message interface and the reversed message interface, can be invoked by the application through an application layer interface so as to invoke the functions of the extended function module. The application layer interface of the application can be set up in a similar way to the docbase management system interface.

The application of several typical extended function modules is explained hereinafter.

An extended window function module, which normally needs not be registered in the docbase management system, provides a function of displaying and processing a window. When the docbase management system obtains the extension identifier from the extended data, the docbase management system further acquires the identifier interface of each extended function module through the enumeration interface of the each extended function module, acquires the extension identifier of each extended function module by invoking each identifier interfaces and compares the extension identifier of the extended data with the extension identifier of each extended function modules; when the extension identifier of the extended data matches the extension identifier of an extended function module, an extended instance is constructed by invoking the construction interface of the extended function module according to the extension identifier and the extended instance data and a corresponding window is shown. When the window needs to be erased, the extended instance is destroyed by using the destruction interface of the extended function module.

An extended streaming media function module, which is similar to the extended window function module, provides a function of processing and playing streaming media data in a window. The identifier of an extended streaming media function module is related to the type of the streaming media data and the extended instance data include the streaming media data. The extended streaming media function module normally needs not be registered in the docbase management system.

An extended image function module provides a function of processing images, and the extended data to be processed by the module are usually stored as an image object provided by the system. The extended image function module is normally registered in the docbase management system. When the docbase management system processes an image object of an unknown image type, the docbase management system shall use the image type as the extension identifier to find a corresponding registered extended function module. If the extension identifier of an extended function module matches the image type, the docbase management system invokes a function interface of the matched extended image function module to process data in the image object.

Extended data encryption/decryption function modules provide data encryption/decryption functions, implement different encryption/decryption algorithms respectively, and are distinguished by extension identifiers and used to provide encryption/decryption functions for docbase data.

Extended data compression/decompression function module provide data compression/decompression function, implement different compression/decompression algorithms, and are distinguished by extension identifiers and used to provide data compression/decompression function for docbase data.

An extended data conversion function module provides data conversion function. The extended data conversion function module normally needs to be registered in the docbase management system. The invoke of the extended data conversion function module is different from other extended function modules in that the extended data conversion function module needs the support of a container object in the docbase management system. Multiple objects supported by the docbase management system and extended data conversion instances can be added into the container object. While accessing the objects in the container, the container processes the stored data by using the extended data conversion instances and converts the stored data into objects. The specific conversion process includes following steps: for every extended data conversion instance, the interfaces of the corresponding extended function module registered in the docbase management system is queried according to the extension identifier, the function interface used for data conversion within the interfaces of the extended function module is found, and then the data are converted. When the objects in the container are written into the storage device, the container also converts and saves the object data by using the extended data conversion instances in a procedure similar to the procedure described above.

It can be seen from the above description that, in the method for extending docbase management system functions provided by the present invention, the system extension interface is reserved in the docbase management system, when the docbase management system functions need extending, the extended function modules independent of the docbase management system and compatible with the system extension interface are developed to meet the requirements, and when the docbase management system needs to process the extended data, the functions of the extended function modules are invoked through the system extension interface to process the extended data. Therefore the docbase management system needs not be recompiled or republished and the functions of the docbase management system can be extended conveniently and flexibly.

Figure 4:
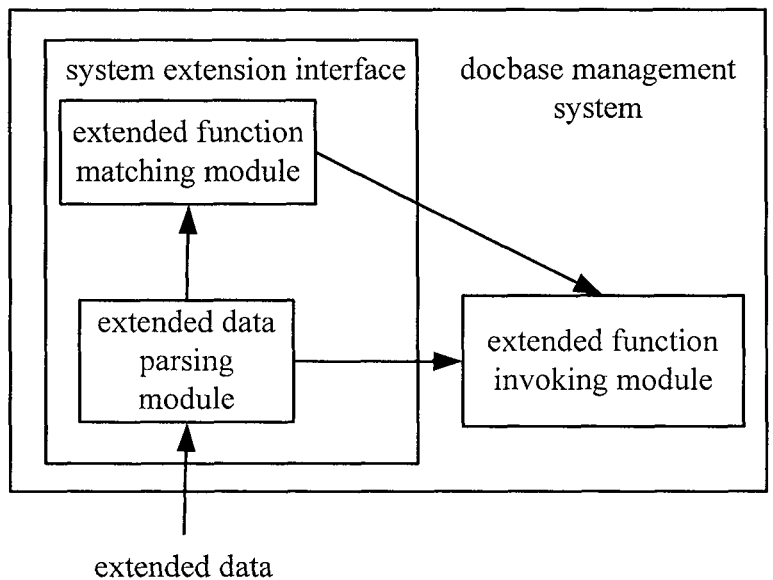
FIG. 4 is a detailed structure diagram of the docbase management system in accordance with an embodiment of the present invention.

FIG. 4 is a detailed structure diagram of the docbase management system in accordance with an embodiment of the present invention. The docbase management system is an embodiment of the docbase management system shown in FIG. 2. Specifically, the docbase management system includes a system extension interface and an extended function invoking module, wherein the system extension interface includes an extended data parsing module and an extended function matching module.

In the docbase management system, the extended data parsing module in the system extension interface is adapted to parse extended data from the docbase management system, obtain the extension identifier of the extended data and send the extension identifier to the extended function matching module in the system extension interface.

The extended function matching module is adapted to receive the extension identifier from the extended data parsing module, determine a corresponding extended function module according to the extension identifier and notify the extended function invoking module of the determined extended function module.

The extended function invoking module is adapted to receive the notification from the extended function matching module and invoke the interface of the determined extended function module to process the extended data from the extended data parsing module.

The extended data acquired by the docbase management system from a storage device is an extended object and the extended data parsing module parses the extended data according to the format of the extended object and obtains the extension identifier.

The extended function module may include an identifier interface adapted to provide the extension identifier for the extended function module; and the extended function matching module acquires the extension identifier through the identifier interface of the extended function module.

The extended function module may further include an enumeration interface adapted to enumerate all the interfaces of the extended function module; and the extended function matching module acquires the identifier interface and other interfaces of the extended function module through the enumeration interface.

The extended function module may further include a construction interface and a destruction interface. The extended function invoking module constructs an extended instance corresponding to the extended data by invoking the construction interface of the extended function module, and when the extended data has been processed by invoking the corresponding interface of the extended function module, destroys the extended instance by invoking the destruction interface of the extended function module.

It can be seen from the description above that the docbase management system of the present invention is able to find the extended function module matching the extended data from extended function modules and to invoke the matched extended function module to process the extended data. In this way, the docbase management system functions can be extended by using extended function modules without recompiling and republishing the docbase management system, therefore the docbase management system functions can be extended conveniently and flexibly.

The invention claimed is:

1. A method for extending docbase management system functions, comprising:
   determining, by a docbase management system, extended data is in a format not supported by the docbase management system;
   parsing the extended data according to a preset format to obtain an extension identifier of the extended data when the extended data is stored as an extended object; or taking format information of the extended data as an identifier of the extended data when the extended data is stored as an image object;
   searching for an extended function module which matches the extension identifier of the extended data, wherein, the extended function module is compatible with a system extension interface in a the docbase management system; and
   invoking, through the system extension interface of the docbase management system, the extended function module found to process the extended data,
   wherein the extended function module comprises an enumeration interface and a function interface, the enumeration interface is configured to enumerate all interfaces of the extended function module and the function interface is configured to provide the function of processing the extended data; and
   invoking, through the system extension interface of the docbase management system, the determined extended function module to process the extended data comprises:
   invoking the enumeration interface of the determined extended function module,
   searching for the function interface configured to process the extended data in the extended function module; and
   invoking the function interface to process the extended data.

2. The method of claim 1, wherein, the extended data is parsed by the docbase management system, and the extended function module is found by the docbase management system.

3. The method of claim 2, wherein the extended function module comprises an identifier interface configured to provide the extension identifier for the extended function module; and
   the docbase management system searches, through the identifier interfaces of the extended function modules, for the extended function module with an extension identifier matching the extension identifier of the extended data, and regards the found extended function module as the extended function module which matches extended data.

4. The method of claim 2, wherein mapping information between extended function modules and extension identifiers are registered in the docbase management system; and
   the docbase management system searches, according to the registered mapping information between the extended function modules and the extension identifiers, for the extended function module matching the extension identifier of the extended data, and regards the found extended function module as the extended function module which matches extended data.

5. The method of claim 1, further comprising:
   constructing, by the extended function module, an extended instance by utilizing the extension identifier of the extended data for processing the extended data;

wherein the extended instance supports pre-defined standard messages and comprises at least one of:
a message interface, configured to receive messages from the docbase management system or an application; and
a reversed message interface, configured to send messages to the docbase management system or the application.

6. The method of claim 1, before invoking, through the system extension interface in the docbase management system, the extended function module found to process the extended data, further comprising:
loading the extended function module.

7. The method of claim 6, wherein before being loaded by the docbase management system, the extended function module is stored as a file, and the file for storing the extended function module contains one or multiple extended function modules.

8. The method of claim 7, wherein the file for storing the extended function module is on a remote server.

9. The method of claim 1, wherein the extended function module provides a function of displaying and processing a window.

10. The method of claim 9, wherein the extended function module further provides a function of processing streaming media data and playing the processed streaming media data in a display window.

11. The method of claim 1, wherein the extended function modules provides any or any combination of following functions: data encryption, data decryption, data compression, data decompression, data conversion, image processing.

12. The method of claim 1, wherein characteristic information of the extended data is taken as the extension identifier.

13. The method of claim 12, wherein the characteristic information of the extended data comprises at least one of: filename postfix of the file of the extended data, the image type of the extended data when the type of the extended data is image, the extension identifier field in the extended data when the extended data are stored as an extended object, and the type of the extended data when the extended data are generated during document processing.

14. A docbase management system comprising:
a processor and a memory, and:
a first module, configured to determine extended data is in a format not supported by the docbase management system, parse the extended data according to a preset format to obtain the extension identifier of the extended data when the extended data is stored as an extended object; or take format information of the extended data as an identifier of the extended data when the extended data is stored as an image object, and send the extension identifier to a second unit, search for art extended function module matching the extension identifier, and notify a second module of the determined extended function module, wherein, the extended function is compatible with a system extension interface in a docbase management system, and the second module, configured to receive the notification from the first module and invoke, through the system extension interface in the docbase management system, an interface of the determined extended function module to process the extended data, wherein the extended function module comprises an enumeration interface and a function interface, the enumeration interface is configured to enumerate all interfaces of the extended function module and the function interface is configured to provide the function of processing the extended data; and invoking, through the system extension interface of the docbase management system, the determined extended function module to process the extended data comprises:

invoking the enumeration interface of the determined extended function module, searching for the function interface configured to process the extended data in the extended function module; and invoking the function interface to process the extended data.

15. The docbase management system of claim 14, wherein the memory stores the extended function module compatible with the system extension interface in the docbase management system,
wherein, the extended function module is able to process extended data which matches the extended function module.

16. The docbase management system of claim 15, wherein the extended function module is configured to provide a function of displaying and processing a window.

* * * * *